US012629704B2

(12) United States Patent
Yu

(10) Patent No.: US 12,629,704 B2
(45) Date of Patent: May 19, 2026

(54) SHOWER HEAD STRUCTURE AND SHOWER DEVICE

(71) Applicant: SINYU TECHNOLOGY (FUJIAN) CO., LTD., Fujian (CN)

(72) Inventor: Zhangjun Yu, Zhangzhou (CN)

(73) Assignee: SINYU TECHNOLOGY (FUJIAN) CO., LTD., Fujian (CN)

( * ) Notice: Subject to any disclaimer, the term of this patent is extended or adjusted under 35 U.S.C. 154(b) by 208 days.

(21) Appl. No.: 18/389,687

(22) Filed: Dec. 19, 2023

(65) Prior Publication Data

US 2025/0121383 A1 Apr. 17, 2025

(30) Foreign Application Priority Data

Oct. 12, 2023 (CN) ........................ 202322737446.X

(51) Int. Cl.
*B05B 1/16* (2006.01)

(52) U.S. Cl.
CPC .................................. *B05B 1/1636* (2013.01)

(58) Field of Classification Search
CPC ....... B05B 1/16; B05B 1/1627; B05B 1/1636; B05B 1/1681; B05B 1/169
See application file for complete search history.

(56) References Cited

U.S. PATENT DOCUMENTS 10,132,423 B1 * 11/2018 Lan ....................... F16K 31/602
2011/0226876 A1 9/2011 Xu
2015/0238984 A1 * 8/2015 Lee ......................... B05B 1/169 239/447
2016/0310972 A1 * 10/2016 Lin ........................... B05B 1/18
2017/0056897 A1 * 3/2017 Xu ........................ F16K 27/045

FOREIGN PATENT DOCUMENTS

CN 104923420 A 9/2015
CN 105478251 A 4/2016
CN 113649177 A 11/2021
CN 219615825 U 9/2023

OTHER PUBLICATIONS

PCT Application No. PCT/CN2023/128821, International Search Report mailed Jun. 28, 2024, 2 pp.
PCT Application No. PCT/CN2023/128821, Written Opinion mailed Jun. 28, 2024, 3 pp.

* cited by examiner

*Primary Examiner* — Steven M Sutherland
(74) *Attorney, Agent, or Firm* — BKRIP LLC

(57) ABSTRACT

Shower head structure and shower device includes shower head body, water distributing disc, ratchet wheel, key, connecting rod and reset elastic member. Shower head body includes shell assembly and flow dividing assembly, where multiple groups of water inlets are disposed in and water distributing disc is rotationally mounted on. Water passing holes communicated with one group of water inlets every time are disposed on water distributing disc. Ratchet wheel is fixedly connected to side of water distributing disc away from flow dividing assembly. Key has first end hinged to shell assembly and second end telescopically disposed relative to one side of shell assembly. Connecting rod is slidably disposed in shell assembly and in transmission connection between second end and ratchet wheel. Key drives connecting rod. Reset elastic member has one end connected to shower head body and other end acting on connecting rod. Reset elastic member drives connecting rod.

13 Claims, 8 Drawing Sheets

SHOWER HEAD STRUCTURE AND SHOWER DEVICE

CROSS-REFERENCE TO RELATED APPLICATIONS

The present application claims priority to Chinese patent application No. 202322737446X, entitled "Shower Head Structure and Shower Device", filed to the Chinese Patent Office on Oct. 12, 2023, the entire contents of which is incorporated herein by reference.

TECHNICAL FIELD

The present disclosure relates to the technical field of sanitary ware, and in particular to a shower head structure and shower device.

BACKGROUND ART

In prior art, a toggle switch of a shower head is usually arranged on a water outlet panel of the shower head. When a water outlet way of the shower head needs to be switched, users need to cooperate with both hands to turn a knob, and the resistance is large, which brings inconvenience to the users.

SUMMARY

The present disclosure provides a shower head structure and shower device, which facilitates user to operate with one hand to switch the water outlet way.

The present disclosure provides a shower head structure, including:

- a shower head body, comprising a shell assembly and a flow dividing assembly disposed at one end of the shell assembly, wherein a plurality of groups of water inlets are disposed in the flow dividing assembly;
- a water distributing disc, rotationally mounted on the flow dividing assembly, wherein water passing holes communicated with one of the plurality of groups of water inlets every time are disposed on the water distributing disc;
- a ratchet wheel, fixedly connected to one side of the water distributing disc away from the flow dividing assembly;
- a key, including a first end and a second end, wherein the first end is hinged to the shell assembly, and the second end telescopically disposed relative to a side of the shell assembly;
- a connecting rod, slidably disposed in the shell assembly, wherein the connecting rod is in transmission connection between the second end and the ratchet wheel, and the key is configured to drive the connecting rod to slide, so as to drive the ratchet wheel to rotate; and
- a reset elastic member, wherein one end of the reset elastic member is connected to the shower head body, the other end of the reset elastic member acts on the connecting rod, and the reset elastic member is configured to drive the connecting rod to reset.

Based on the above technical solution, when using the shower head structure provided by the present disclosure, the user may hold the shell assembly with one hand and press the second end of the key. Therefore, the second end may drive the connecting rod to slide, so as to drive the ratchet wheel to rotate, and then the ratchet wheel drives the water distributing disc to rotate, which realizes a switch of the water outlet way and is convenient for the user to operate. At the same time, the first end of the key being hinged to the shell assembly may realize a rotation around axis for the key, which facilitates the user to press, reduces a pressing force for the user, and improves the using experience for the user.

In some possible embodiments, a ring of ratchet teeth is configured on a periphery of the ratchet wheel; and

- a first driving pawl is disposed at one end of the connecting rod away from the key, and the first driving pawl is movably snapped between the two adjacent ratchet teeth.

In some possible embodiments, the connecting rod is provided with a driving direction, a first connecting block is disposed in the shower head body, a second connecting block is disposed on the connecting rod, and the reset elastic member is connected between the first connecting block and the second connecting block; and

- when the connecting rod is slid along the driving direction, the reset elastic member stores elastic potential energy for driving the connecting rod to reset.

In some possible embodiments, along the driving direction, the second connecting block is placed on front side of the first connecting block; and

- when the connecting rod is slid along the driving direction, the reset elastic member is in a tensile state.

In some possible embodiments, a ring of ratchet teeth is configured on the periphery of the ratchet wheel;

- the shower head structure further includes a driving wheel, the driving wheel is rotationally mounted on the water distributing disc, a second driving pawl and a connecting lug are disposed at a periphery of the driving wheel, the second driving pawl is movably snapped between the two adjacent ratchet teeth, and a waist hole extending along a radial direction of the driving wheel is disposed in the connecting lug; and
- an axis pin is disposed at the end of the connecting rod away from the key, and the axis pin is slidably disposed in the waist hole.

In some possible embodiments, the connecting rod is provided with the driving direction, and when the connecting rod slides along the driving direction, the driving wheel rotates along a first rotation direction;

- a connecting arm is further disposed at a periphery of the driving wheel, a third connecting block is disposed in the shower head body, and the reset elastic member is connected between the connecting arm and the third connecting block; and
- when the driving wheel rotates along the first rotation direction, the reset elastic member stores elastic potential energy for driving the driving wheel to rotate reversely along the first rotation direction.

In some possible embodiments, along the first rotation direction, the connecting arm is placed on the front side of the third connecting block; and

- when the driving wheel rotates along the first rotation direction, the reset elastic member is in the tensile state.

In some possible embodiments, a guiding plate is protrudingly disposed at one side of the second end near the interior of the shell assembly, and a guiding bevel is disposed at one side of the guiding plate near the connecting rod;

- the guiding bevel is gradually inclined towards a direction near the connecting rod from an end near the first end to an end away from the first end; and
- an abutting part that abuts against the guiding bevel is protrudingly disposed at one side of the connecting rod near the key, and a surface of the abutting part near the guiding bevel is a circular arc surface.

In some possible embodiments, a ring of ratchet teeth is disposed at periphery of the ratchet wheel;

the shower head structure further includes a limiting pawl, one end of the limiting pawl is fixedly connected to the shower head body, and the other end of the limiting pawl is movably snapped between the two adjacent ratchet teeth to limit the ratchet wheel from rotating reversely.

Additionally, the present disclosure provides a shower device, including the shower head structure provided in the embodiments foregoing.

BRIEF DESCRIPTION OF DRAWINGS

In order to more clearly illustrate the technical solution of the embodiments of the present disclosure, drawings to be used in the embodiments will be briefly introduced below. It should be understood that the following drawings only show certain embodiments of the present disclosure, and thus should not be regarded as a limitation of the scope. Other relevant drawings may be acquired from these drawings by persons of ordinary skill in the art without creative labors.

REFERENCE NUMBERS

Figure 1:
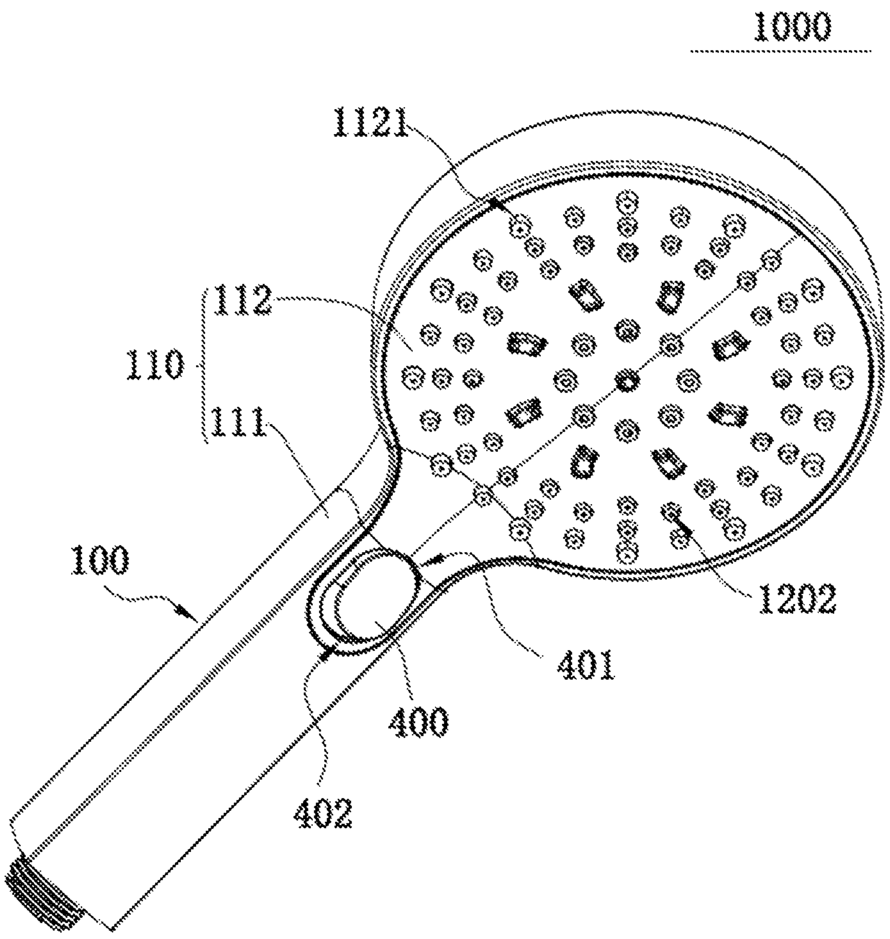
FIG. 1 shows a schematic diagram of three-dimensional structure of the shower head structure in some embodiments.

1000—shower head structure;

100—shower head body; 110—shell assembly; 1101—assembly cavity; 111—shell body; 112—shield; 1121—through hole; 120—flow dividing assembly; 1201—water inlet; 12011—first group of water inlets; 12012—second group of water inlets; 12013—third group of water inlets; 1202—water outlet; 121—first connecting block; 122—third connecting block; 131—water supply pipe; 1311—main pipe; 1312—branch pipe; 13121—guiding strip; 132—cover; 140—guiding cavity;

200—water distributing disc; 210—water passing hole; 220—connecting post;

300—ratchet wheel; 310—ratchet tooth;

400—key; 401—first end; 402—second end; 410—guiding plate; 411—guiding bevel; 412—limiting block; 420—limiting flange;

500—connecting rod; 510—first driving pawl; 520—second connecting block; 530—abutting part; 540—guiding block; 541—guiding slot; 550—axis pin; 560—limiting plate;

600—reset elastic member;

700—driving wheel; 710—second driving pawl; 720—connecting lug; 721—waist hole; 730—connecting arm;

800—limiting pawl.

DETAILED DESCRIPTION OF EMBODIMENTS

The embodiments of the present disclosure are described in detail below, and examples of the embodiments are shown in the drawings, wherein the same or similar numbers from beginning to end denotes the same or similar elements or elements with the same or similar functions. The embodiments described below referring to drawings are exemplary and are only intended to illustrate the present disclosure, and are not to be understood as a limitation of the present disclosure.

In the description of the present disclosure, it is to be understood that, orientations or position relationships indicated by terms "center", "longitudinal", "transverse", "length", "width", "thickness", "up", "down", "front", "back", "left", "right", "vertical", "horizontal", "top", "bottom", "interior", "external", "clockwise", "counterclockwise", "axial", "radial", "peripheral", etc., are the orientations or position relationships based on those shown in the drawings, which are intended only to facilitate the description of the present disclosure and to simplify the description, and are not intended to indicate or imply that the device or element referred to must be in a particular orientation, be constructed and operated in a particular orientation, and therefore cannot be understood as a limitation of the present disclosure.

Furthermore, the terms "first" and "second" are used for descriptive purposes only, and are not to be understood as indicating or implying relative importance or implicitly specifying the number of technical features indicated. Therefore, a feature defined by "first" or "second" may indicatively or implicitly include one or more the features. In the description of the present disclosure, "plurality" means two or more, unless otherwise expressly and specifically defined.

In the present disclosure, unless otherwise expressly ruled and defined, the terms "mount", "connect", "link", "fix", etc., are to be understood in a broad sense, e.g., a fixed connection, a removable connection, or an integral, a mechanical connection, or an electrical connection, a direct connection, an indirect connection through an intermediate medium, a communication within two elements, or an interaction between two elements. For persons of ordinary skill in the art, the specific meaning of the above terms in the present disclosure may be understood according to specific situations.

In the present disclosure, unless otherwise expressly ruled and limited, a first feature "over" or "under" a second feature may be that the first feature is directly attached to the second feature, or the first feature is attached to the second features through the intermediate medium. Furthermore, the first feature is "over", "above" and "on top of" the second feature may be that the first feature is directly above or diagonally above the second feature, or only denotes that a horizontal height of the first feature is higher than the second feature. The first feature is "under", "below" and "beneath" the second feature may be that the first feature is directly below or diagonally below the second feature, or only denotes that a horizontal height of the first feature is lower than the second feature.

Embodiment 1

As shown in FIG. 1, the embodiments provide a shower head structure 1000, which is easy to be operated by the user with one hand to switch the water outlet way.

As shown in FIG. 1 to FIG. 3 and FIG. 6, the shower head structure 1000 may include the shower head body 100, the water distributing disc 200, the ratchet wheel 300, the key 400, the connecting rod 500 and the reset elastic member 600.

The shower head body 100 may include the shell assembly 110 and the flow dividing assembly 120 disposed at one end of the shell assembly 110, wherein the flow dividing assembly 120 may be used to provide a plurality types of different water outlet ways. Accordingly, the flow dividing assembly 120 may include a plurality of groups of water inlets 1201 and a plurality of groups of water outlets 1202, and the plurality of groups of water inlets 1201 may be communicated with the plurality of groups of water outlets 1202 in one-to-one correspondence. One group of water outlets 1202 may be corresponded to a type of water outlet way.

The water distributing disc 200 may be rotationally mounted on one side of the flow dividing assembly 120 with the water inlet 1201 arranged thereon. The water passing holes 210 are disposed in the water distributing disc 200 and the water passing holes 210 may be communicated with one of the plurality of groups of water inlet 1201 every time, which may guide the water flow.

It may be understood that when the water passing holes 210 are communicated with one of the plurality of groups of water inlets 1201, the water flow may enter into the group of water inlets 1201 through the water passing holes 210 and be sprayed out through the water outlets 1202 which are communicated with the group of water inlets 1201, so as to form a corresponding water outlet way.

The ratchet wheel 300 may be fixedly connected to the side of the water distributing disc 200 away from the flow dividing assembly 120.

Figure 4:
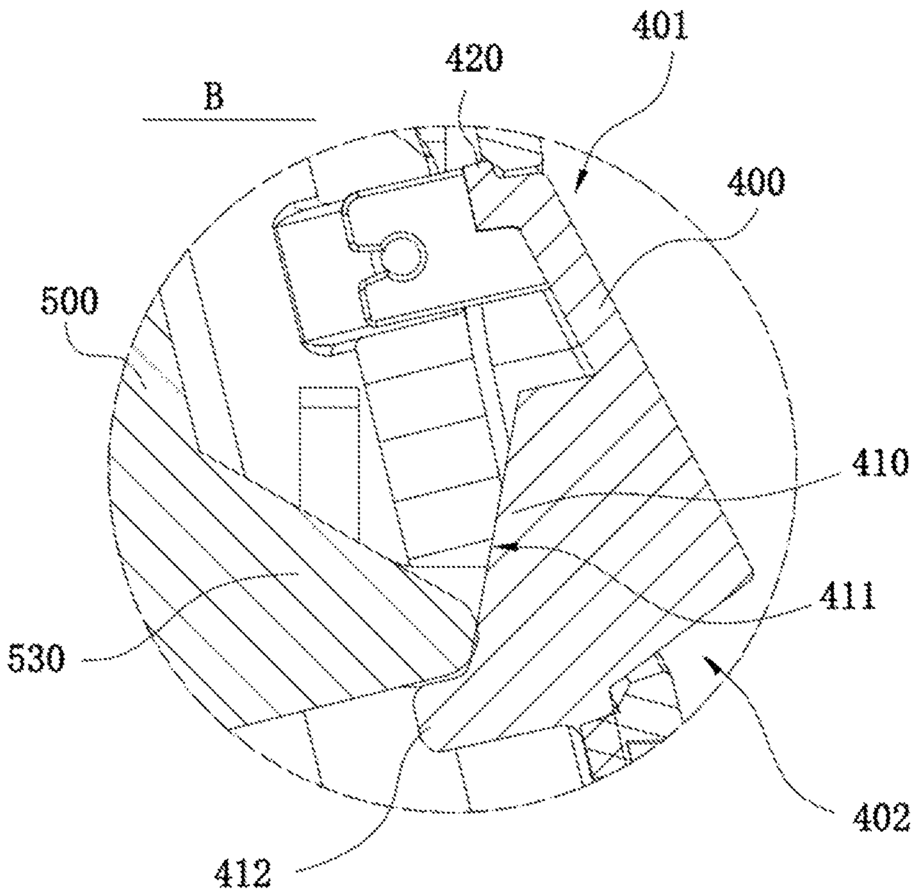
FIG. 4 shows a schematic diagram of partially enlarged structure of part B in FIG. 2.

In conjunction with FIG. 4, in some embodiments, the key 400 may include the first end 401 and the second end 402, wherein the first end 401 may be hinged to the shell assembly 110. The second end 402 may be movably disposed relative to the first end 401 and may be stretched relative to one side of the shell assembly 110, so that a pressing operation of the user is easy to be performed.

The connecting rod 500 is slidably disposed in the shell assembly 110 and the connecting rod 500 may be in transmission connection between the second end 402 of the key 400 and the ratchet wheel 300. When the user presses the second end 402 of the key 400, the connecting rod 500 may be driven to slide, and the connecting rod 500 may drive the ratchet wheel 300 to rotate. The rotation of the ratchet wheel 300 may drive the water distributing disc 200 to rotate synchronously, so that the water passing holes 210 of the water distributing disc 200 may be switched to be communicated with the adjacent group of water inlets 1201, so as to realize a switching of different water outlet ways.

The reset elastic member 600 may also be disposed in the shell assembly 110. One end of the reset elastic member 600 may be connected to the shower head body 100, and the other end of the reset elastic member 600 may act on the connecting rod 500. The reset elastic member 600 may be configured to drive the connecting rod 500 to reset, and thus reset the key 400, so that the user can perform the next pressing operation.

When using the shower head, the user may hold the shell assembly 110 with one hand and press the second end 402 of the key 400, so that the connecting rod 500 is driven to push the ratchet wheel 300 to rotate. The ratchet wheel 300 may drive the water distributing disc 200 to rotate synchronously, so that the water passing holes 210 may be switched and communicated between the different water inlets 1201, which may provide different water outlet ways.

It can be seen that, the shower head structure 1000 provided by the present disclosure may be operated by the user with one hand to switch the water outlet ways, which is convenient and fast to be operated. One end of the key 400 is hinged to the shower head structure 1000 to realize a pressing around the axis of the key 400, which may reduce a pressing force of the user, which further enhances a convenience of operation and improves the user experience.

Embodiment 2

The embodiment provides a shower head structure 1000, based on the Embodiment 1, which further includes the following parts.

Figure 2:
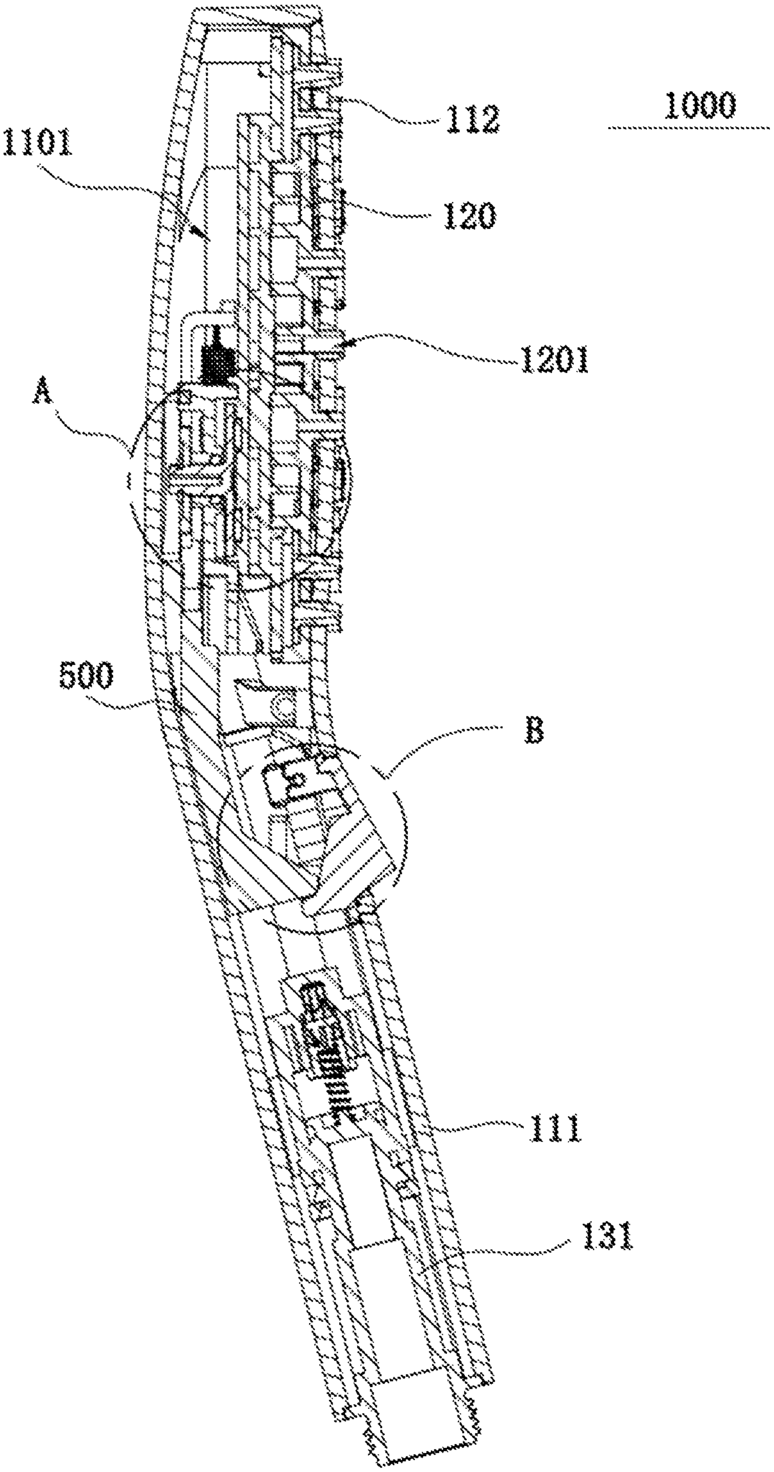
FIG. 2 shows a schematic diagram of sectional structure of the shower head structure in some embodiments.

As shown in FIG. 1 and FIG. 2, the shell assembly 110 may include the shell body 111 and the shield 112, wherein one end of the shell body 111 may approximately be tubular. An assembly cavity 1101 with an opening structure on one side is disposed in the other end of the shell body 111. The shield 112 may be disposed at a position of the opening structure of the shell body 111 and the shield 112 may close the opening structure of the assembly cavity 1101.

Figure 3:
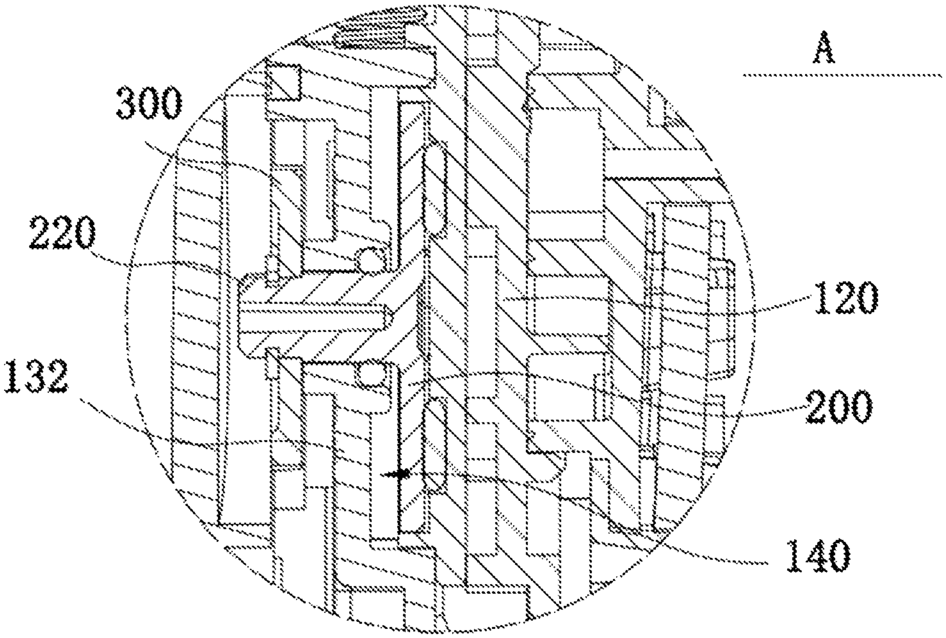
FIG. 3 shows a schematic diagram of partially enlarged structure of part A in FIG. 2.

In conjunction with FIG. 3, assemblies such as the flow dividing assembly 120, the water distributing disc 200 and the ratchet wheel 300 may be accommodated in the assembly cavity 1101. The flow dividing assembly 120 may be disposed near the side of the shield 112. The water distributing disc 200 and the ratchet wheel 300 may be disposed at the side of the flow dividing assembly 120 away from the shield 112 in sequence. Additionally, the water outlets 1202 of the flow dividing assembly 120 may be faced with the shield 112, the through hole 1121 may be disposed on the shield 112, and the through hole 1121 is faced and communicated with the water outlet 1202. The water outlets 1202 of the flow dividing assembly 120 may be communicated with the outside through the through hole 1121 to spray the water flow outwardly.

Figure 5:
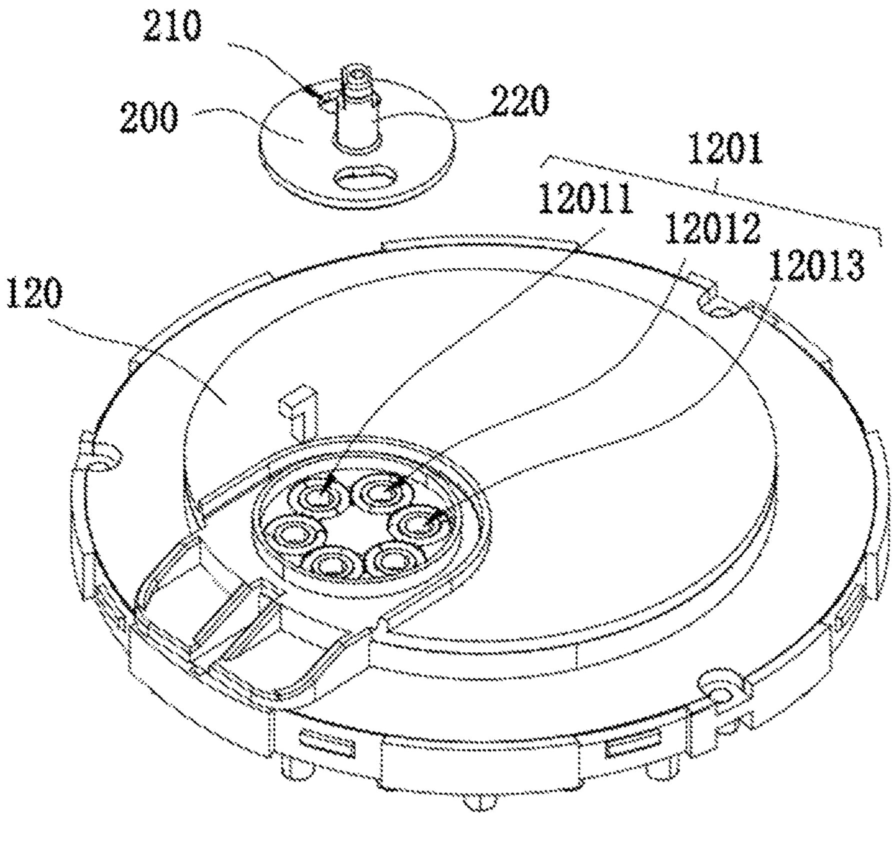
FIG. 5 shows a schematic diagram of explosion structure of the flow dividing assembly and the water distributing disc in some embodiments.

As shown in FIG. 5, in some embodiments, the flow dividing assembly 120 may include three groups of water inlets 1201, i.e., the first group of water inlets 12011, the second group of water inlets 12012 and the third group of water inlets 12013, and each group may include two water inlets 1201. Each of the water inlets 1201 of the three groups of water inlets 1201 may be disposed alternatively in sequence surrounding the rotation axis of the water distributing disc 200, i.e., the two water inlets 1201 of the same group are oppositely disposed. The water distributing disc 200 may include two water passing holes 210, the two water passing holes 210 may be symmetrically disposed. When the water distributing disc 200 is rotated, the two water passing holes 210 may be communicated with the two water inlets 1201 of the same group in one-to-one correspondence.

It may be understood that, when the water passing holes 210 of the water distributing disc 200 are initially communicated with the first group of water inlets 12011, after the water distributing disc 200 rotates a round, the water passing holes may be switched back to be communicated with the first group of water inlets 12011. That is, when using the shower head, the user can continuously turn the water distributing disc 200 towards one direction to switch the water outlet ways, and the water outlet way can be switched back to the initial state without a reverse operation, so as to save time and effort.

In some other embodiments, the flow dividing assembly 120 may also include two, four or five groups of water inlets 1201, etc., and each group of water inlets 1201 may include one, three or five water inlets 1201, etc. Correspondingly, the water distributing disc 200 may include the water passing holes 210, which have an equal number of each group of water inlets 1201.

Figure 6:
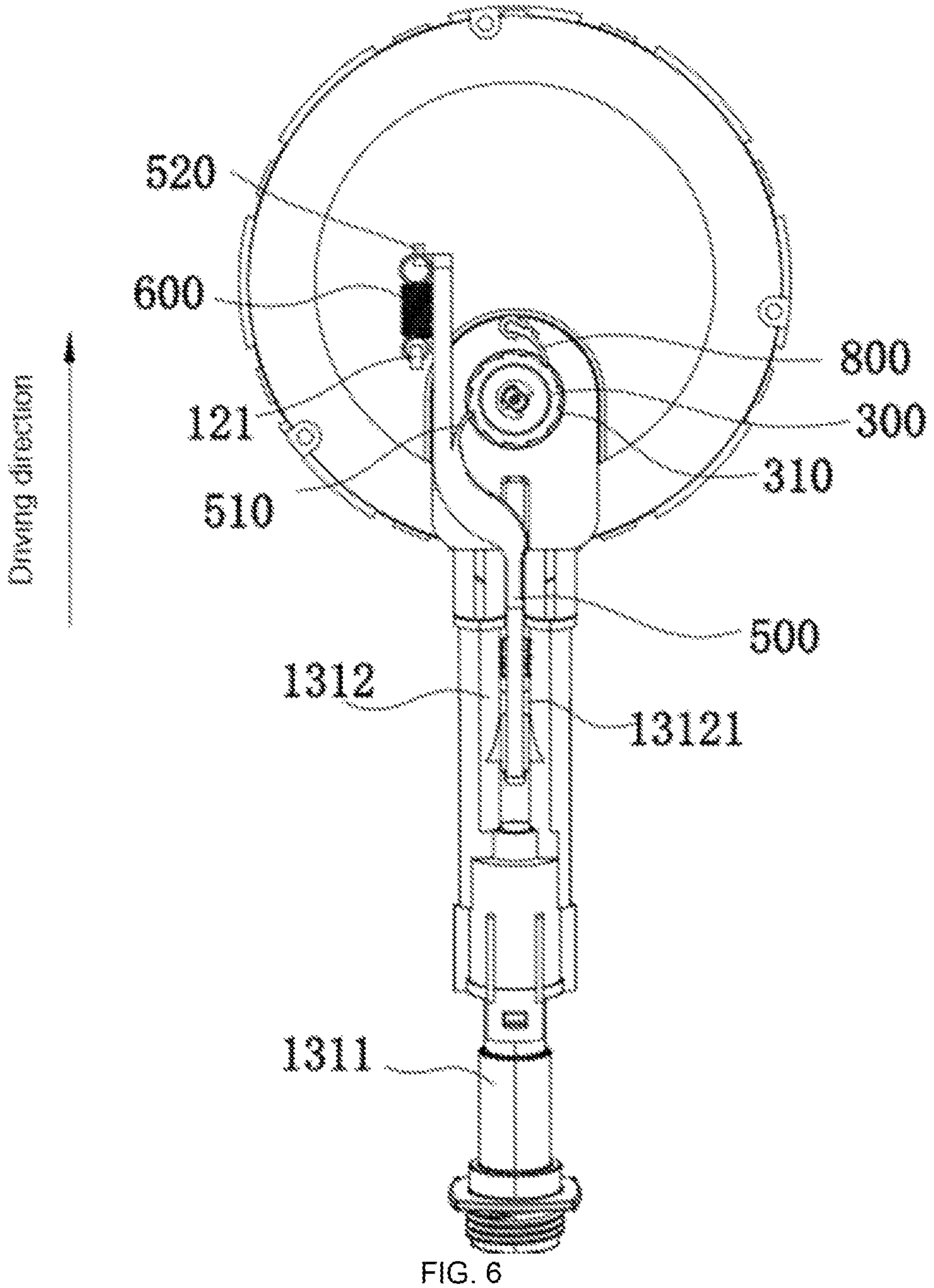
FIG. 6 shows a schematic diagram of interior structure of the shower head structure in some embodiments.

As shown in FIG. 2, FIG. 3 and FIG. 6, the shower head body 100 further includes the water supply pipe 131 and the cover 132. The cover 132 may be disposed on the side of the water distributing disc 200 away from the flow dividing assembly 120, and the cover 132 may be fixedly and hermetically connected to the flow dividing assembly 120. Additionally, a gap is disposed between the cover 132 and the water distributing disc 200. The guiding cavity 140 is formed between the cover 132 and the water distributing disc 200, and the guiding cavity 140 may be communicated with the water passing holes 210 in the water distributing disc 200.

The water supply pipe 131 may be mounted in the shell assembly 110, and one end of the water supply pipe 131 may be connected to the cover 132 and communicated with the guiding cavity 140. The end of the water supply pipe 131 away from the guiding cavity 140 may extend to the end of the shell assembly 110 away from the assembly cavity 1101, which may be used to be communicated with shower pipes.

In some embodiments, the water supply pipe 131 may include the main pipe 1311 and two branch pipes 1312. The two branch pipes 1312 may be disposed side by side and at intervals. The two branch pipes 1312 may be connected to one end of the main pipe 1311 near the guiding cavity 140. Accordingly, one end of each of the two branch pipes 1312 away from the main pipe 1311 may be connected to the cover 132 and communicated with the guiding cavity 140. The end of the main pipe 1311 away from the two branch pipes 1312 may be configured to be communicated with the shower pipes.

In conjunction with FIG. 5, the connecting post 220 is protrudingly disposed on one side of the water distributing disc 200 near the cover 132. The connecting post 220 is disposed on the cover 132 and protrudes relative to the side of the cover 132 away from the flow dividing assembly 120. In the embodiment, the connecting post 220 may be hermetically connected to the cover 132 at connecting position through a sealing ring, so as to prevent the occurrence of water leakage.

The ratchet wheel 300 may be fixedly connected to one end of the connecting post 220 protruding relative to the cover 132 by means of a circlip. It may be understood that, the ratchet wheel 300 may be disposed on the side of the cover 132 away from the flow dividing assembly 120. Additionally, a matching surface of the ratchet wheel 300 and the connecting post 220 may be non-circular, which prevents a relative rotation between the ratchet wheel 300 and the water distributing disc 200.

Figure 7:
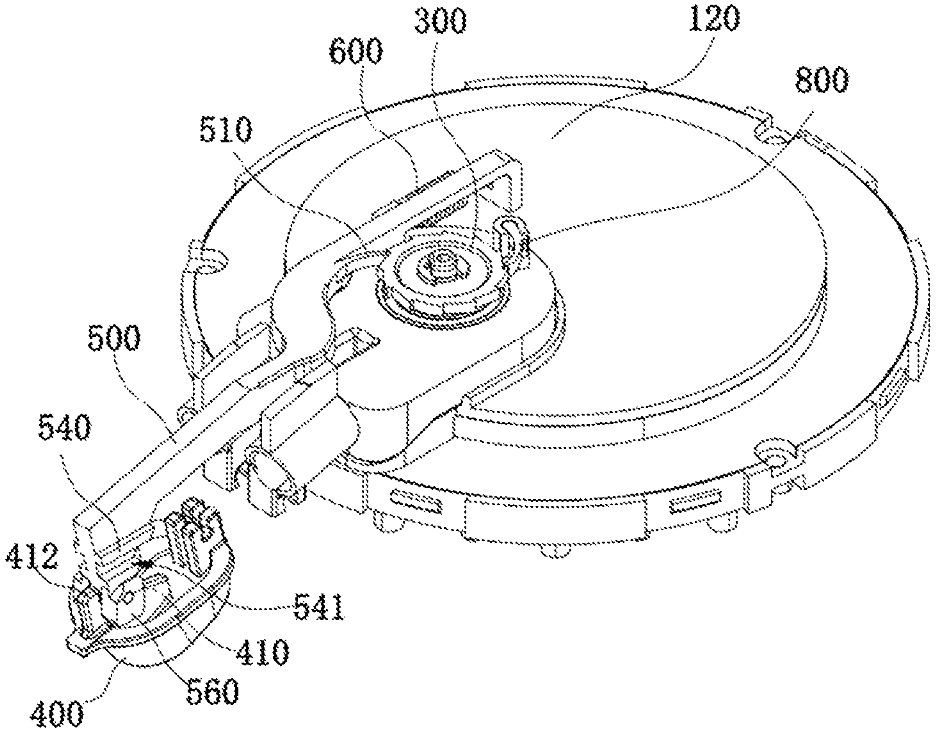
FIG. 7 shows a schematic diagram of partial interior structure of the shower head structure in some embodiments.

As shown in FIG. 6 and FIG. 7, a ring of ratchet teeth 310 is configured on periphery of the ratchet wheel 300. In some embodiments, the connecting rod 500 is slidably disposed in the assembly cavity 1101, and may be placed on the side of the flow dividing assembly 120 near the ratchet wheel 300. The end of the connecting rod 500 away from the key 400 may extend to one side of the ratchet wheel 300, and may be separately disposed to the ratchet wheel 300. The other end of the connecting rod 500 may extend between the two branch pipes 1312.

In some embodiments, the first driving pawl 510 is disposed on the end of the connecting rod 500 away from the key 400. The first driving pawl 510 may be disposed on the side of the connecting rod 500 near the ratchet wheel 300, and the first driving pawl 510 is movably connected between two adjacent ratchet teeth 310.

Additionally, a driving direction parallel to a slidable direction of the connecting rod 500 may be configured. When sliding along the driving direction, the connecting rod 500 may be moved towards a direction away from the main pipe 1311, and may push the ratchet wheel 300 to rotate by the first driving pawl 510, and the first driving pawl 510 may be switched between the ratchet teeth 310 by way of one to one, so as to switch the water outlet ways.

In some embodiments, the second connecting block 520 is configured on the end of the connecting rod away 500 from the key 400, the second connecting block 520 may be extended to the side near the flow dividing assembly 120. Additionally, the second connecting block 520 may be disposed at an end of the first driving pawl 510 away from the key 400.

Correspondingly, the first connecting block 121 is protrudingly disposed at the side of the flow dividing assembly 120 near the connecting rod 500, and the first connecting block 121 may be oppositely and separately disposed from the second connecting block 520. Additionally, the first connecting block 121 may be disposed at the end of the second connecting block 520 near the key 400, i.e., the second connecting block 520 may be disposed on the front side of the first connecting block 121 along the driving direction of the connecting rod 500.

One end of the reset elastic member 600 may be fixedly connected to the first connecting block 121, the other end of the reset elastic member 600 may be fixedly connected to the second connecting block 520. When the key 400 is not pressed, the reset elastic member 600 may be in a tensile or naturally elongated state. In some embodiments, a tension spring may be selected for the reset elastic member 600.

In some other embodiments, an elastic cord may also be selected as the reset elastic member 600, etc.

When the key 400 is pressed and the connecting rod 500 slides along the driving direction, the reset elastic member 600 may be in the tensile state and stores the elastic potential energy. When the pressing force acting on the key 400 is withdrawn, under the action of the elastic potential energy of the reset elastic member 600, the connecting rod 500 may be reset along the driving direction in a reverse sliding way, and drive the key 400 to be reset synchronously.

In some other embodiments, the second connecting block 520 may also be disposed at the end of the first driving pawl 510 near the key 400. The first connecting block 121 may also be protrudingly disposed at the side of the cover 132 or the water supply pipe 131 near the ratchet wheel 300. The second connecting block 520 may be disposed on the front side of the first connecting block 121 along the driving direction of the connecting rod 500.

In some other embodiments, the second connecting block 520 may be disposed on a rear side of the first connecting block 121 along the driving direction of the connecting rod 500. When the connecting rod 500 is slid along the driving direction, the reset elastic member 600 may be in a contraction state and stores the elastic potential energy.

As shown in FIG. 1 and FIG. 4, the abutting part 530 is disposed at the end of the connecting rod 500 near the key

400, and the abutting part 530 may be protrudingly disposed at the side of the connecting rod 500 near the key 400. The guiding plate 410 is disposed at the second end 402 of the key 400, and the guiding plate 410 may be protrudingly disposed at the side of the key 400 near the interior of the shell assembly 110, i.e., near the side near the connecting rod 500. Additionally, the guiding bevel 411 is further disposed at the side of the guiding plate 410 near the connecting rod 500. The guiding bevel 411 may be gradually inclined towards the direction near the connecting rod 500 from the end near the first end 401 to the end away from the first end 401.

When the user presses the second end 402 of the key 400, the guiding bevel 411 presses the abutting part 530 of the connecting rod 500 and pushes the abutting part 530 to slide along the driving direction, and meanwhile the abutting part 530 may be slid along the guiding bevel 411. When the connecting rod 500 is reset under the action of the reset elastic member 600, the abutting part 530 may react to the guiding bevel 411 and push the key 400 to reset together.

In some embodiments, a surface of the abutting part 530 near the guiding bevel 411 may be the circular arc surface. Therefore, a friction between the guiding bevel 411 and the abutting part 530 may be reduced, the resistance when the user operates is reduced, so as to facilitate the operation by the user and further improve the use experience for the user.

In conjunction with FIG. 6 and FIG. 7, in some embodiments, two limiting plates 560 are further protrudingly disposed at the side of the connecting rod 500 near the key 400. The two limiting plates 560 may be disposed at two side of the abutting part 530 individually, and protrude relative to the side of the abutting part 530 near the key 400. In the embodiment, the guiding plate 410 of the key 400 may be disposed between the two limiting plates 560, which may prevent the abutting part 530 from separating from the guiding bevel 411 in a direction perpendicular to the driving direction, and may also ensure that the key 400 can act on the abutting part 530 smoothly to push the connecting rod 500 to slide.

Additionally, the limiting block 412 is further protrudingly disposed at the side of the guiding plate 410 near the connecting rod 500. The limiting block 412 may be disposed at the end of the guiding bevel 411 away from the first end 401, and the limiting block 412 may protrude relative to the side of the guiding bevel 411 near the connecting rod 500. In the embodiment, in a direction parallel to the slidable direction of the connecting rod 500, the limiting block 412 may be configured to prevent the abutting part 530 from departing from the guiding bevel 411. Therefore, it ensures that the connecting rod 500 may smoothly push the key 400 to reset during the reset process.

In some embodiments, the guiding strips 13121 are protrudingly disposed at the sides of the two branch pipes 1312 close to each other. The two guiding strips 13121 may proximately extend along the slidable direction of the connecting rod 500, and be disposed at intervals. Correspondingly, two symmetrical guiding blocks 540 are protrudingly disposed at both sides of the connecting rod 500, the guiding slots 541 are disposed in both guiding blocks 540, and the two guiding slot 541 may be disposed away from each other. The two guiding strips 13121 may be slidably mounted in the two guiding slots 541 by way of one to one.

When the connecting rod 500 is slid, the guiding strip 13121 may be matched with the guiding slot 541 to provide a guiding function for the connecting rod 500 when sliding, which may prevent the connecting rod 500 from being inclined, etc., so as to ensure the connecting rod 500 to be slid smoothly.

In some embodiments, the limiting flange 420 is protrudingly disposed on a circumferential position, wherein the circumferential position is placed at interior of the key 400 near the shell assembly 110. When the key 400 is not pressed by the user, the limiting flange 420 may be abutted against the interior wall of the shell assembly 110, which may limit the key 400 from departing from the shell assembly 110. Additionally, in some embodiments, the first end 401 of the key 400 may be rotationally connected between the two branch pipes 1312 by structures such as a rotation shaft.

As shown in FIG. 6 and FIG. 7, the shower head structure 1000 further includes the limiting pawl 800. The limiting pawl 800 may be fixedly mounted at the side of the cover 132 near the ratchet wheel 300, and the limiting pawl 800 may be disposed at a circumferential side of the ratchet wheel 300. In the embodiment, the limiting pawl 800 may be movably snapped between two adjacent ratchet teeth 310.

When the connecting rod 500 is slid along the driving direction to drive the ratchet wheel 300 to rotate, the limiting pawl 800 may be switched between the two corresponding ratchet teeth 310 and prevent the ratchet wheel 300 from rotating reversely, which ensures that the ratchet wheel 300 and the water distributing disc 200 are maintained at a position after rotation, and also ensures that the flow dividing assembly 120 is maintained as a water outlet way after switched. It may be understood that when the connecting rod 500 pushes the ratchet wheel 300 to rotate, the rotation direction of the ratchet wheel 300 may be noted as positive direction, and negative direction conversely.

Embodiment 3

The embodiment provides a shower head structure 1000, compared with the Embodiment 2, the differences of which may further include as follows.

Figure 8:
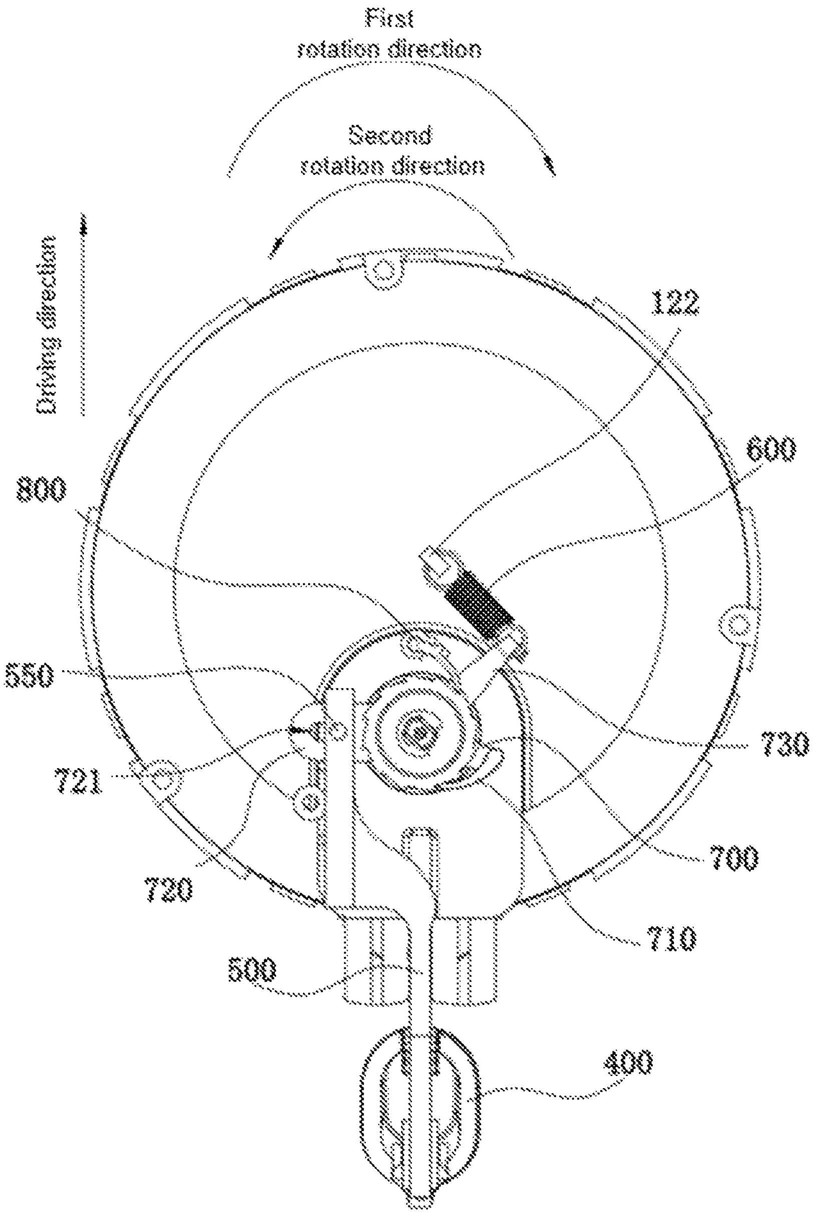
FIG. 8 shows a schematic diagram of partial interior structure of the shower head structure in some other embodiments.

As shown in FIG. 8, the shower head structure 1000 further includes the driving wheel 700, wherein the driving wheel 700 may be rotationally mounted on the connecting post 220 of the water distributing disc 200, and may be placed at the side of the ratchet wheel 300 near the water distributing disc 200.

In some embodiments, the second driving pawl 710 and connecting lug 720 are disposed at periphery of the driving wheel 700.

The waist hole 721 extending along radial direction of the driving wheel 700 is disposed on the connecting lug 720. The axis pin 550 is protrudingly disposed at the end of the connecting rod 500 away from the key 400. The axis pin 550 may be disposed in the waist hole 721 and may be slid in the waist hole 721 along radial direction of the driving wheel 700. The second driving pawl 710 is movably snapped between two adjacent ratchet teeth 310 in the ratchet wheel 300.

When the connecting rod 500 is slid along the driving direction, the driving wheel 700 may be driven to rotate along the first rotation direction through the cooperation of the axis pin 550 and the connecting lug 720. Then the ratchet wheel 300 may be driven to rotate by the second driving pawl 710, and the second driving pawl 710 may be switched between the ratchet teeth 310 one by one.

In some embodiments, the connecting arm 730 is further protrudingly disposed at the periphery of the driving wheel 700. The third connecting block 122 is protrudingly disposed at the side of the flow dividing assembly 120 near the water distributing disc 200. Along the first rotation direction, the connecting arm 730 may be disposed on the front side of the third connecting block 122. The reset elastic member 600 may be connected between the third connecting block 122 and the connecting arm 730.

When the driving wheel 700 is not driven by the connecting rod 500, the reset elastic member 600 may be in the naturally elongated state or tensile state. When the user presses the key 400, the connecting rod 500 is driven to slide along the driving direction, the driving wheel 700 may be driven to rotate along the first rotation direction, and the reset elastic member 600 may be in the tensile state and stores the elastic potential energy. When the user withdraws the pressure on the key 400, the driving wheel 700 may be rotated and reset along the second rotation direction by the action of the reset elastic member 600, and the key 400 may be driven to reset by the connecting rod 500 at the same time. It may be understood that the second rotation direction may be opposite to the first rotation direction.

In some other embodiments, along the first rotation direction, the third connecting block 122 may also be disposed on the front side of the connecting arm 730. When the driving wheel 700 is rotated along the first rotation direction, the connecting arm 730 gradually presses the reset elastic member 600, and the reset elastic member 600 may be in the contraction state and stores the elastic potential energy.

The embodiment also provides a shower device, which may include the shower head structure 1000 provided in the embodiments foregoing.

In the detailed description, reference terms, such as "an embodiment," "some embodiments," "example," "specific example," or "some examples", are meant to a specific feature, structure, material or feature described in conjunction with the embodiment or example, which shall be included in at least one embodiment or example of the present disclosure. In the present disclosure, schematic expressions of the terms foregoing may not be same embodiments or examples. Moreover, the specific feature, structure, material or feature described may be combined with each other through a suitable manner in any one or more embodiments or examples. Additionally, without contradicting to each other, persons skilled in the art may combine different embodiments or examples, and features of different embodiments or examples described in the present disclosure.

Although embodiments of the present disclosure have been shown and described above, it is to be understood that the embodiments foregoing are exemplary, and are not to be understood as a limitation of the present disclosure, and persons ordinarily skilled in the art may make changes, modifications, substitutions and variations of the above embodiments within the scope of the present disclosure.

What is claimed is:

1. A shower head structure, comprising:

a shower head body, comprising a shell assembly and a flow dividing assembly located at one end of the shell assembly, wherein a plurality of groups of water inlets are disposed in the flow dividing assembly;

a water distributing disc, rotationally mounted on the flow dividing assembly, wherein a water passing hole communicated with one of the plurality of groups of water inlets every time are disposed on the water distributing disc;

a ratchet wheel, fixedly connected to one side of the water distributing disc away from the flow dividing assembly;

a key, comprising a first end and a second end, wherein the first end is hinged to the shell assembly, the second end is movably disposed relative to the first end;

a connecting rod, slidably disposed in the shell assembly, wherein the connecting rod is in transmission connection between the second end and the ratchet wheel, and the key is configured to drive the connecting rod to slide, so as to drive the ratchet wheel to rotate, wherein a ring of ratchet teeth is configured on a periphery of the ratchet wheel, and a first driving pawl is disposed at one end of the connecting rod away from the key, and the first driving pawl is movably snapped between two adjacent ratchet teeth; and a reset elastic member, wherein one end of the reset elastic member is connected to the shower head body, the other end of the reset elastic member acts on the connecting rod, and the reset elastic member is configured to drive the connecting rod to reset, wherein the shower head structure further comprises a driving wheel, the driving wheel is rotationally mounted on the water distributing disc, a second driving pawl and a connecting lug are disposed at a periphery of the driving wheel, the second driving pawl is movably snapped between two adjacent ratchet teeth, and a waist hole extending along a radial direction of the driving wheel is disposed in the connecting lug; and an axis pin is disposed at an end of the connecting rod away from the key, and the axis pin is slidably disposed in the waist hole.

2. The shower head structure according to claim 1, wherein the connecting rod is provided with a driving direction, a first connecting block is disposed in the shower head body, a second connecting block is disposed on the connecting rod, and the reset elastic member is connected between the first connecting block and the second connecting block; and when the connecting rod is slid along the driving direction, the reset elastic member stores an elastic potential energy for driving the connecting rod to reset.

3. The shower head structure according to claim 2, wherein along the driving direction, the second connecting block is placed on front side of the first connecting block; and when the connecting rod is slid along the driving direction, the reset elastic member is in a tensile state.

4. The shower head structure according to claim 3, wherein a guiding plate is protrudingly disposed at one side of the second end near an interior of the shell assembly, and a guiding bevel is disposed at one side of the guiding plate near the connecting rod;

the guiding bevel is gradually inclined towards a direction near the connecting rod from an end near the first end to an end away from the first end; and an abutting part that abuts against the guiding bevel is protrudingly disposed at one side of the connecting rod near the key, and a surface of the abutting part near the guiding bevel is a circular arc surface.

5. The shower head structure according to claim 3, wherein the shower head structure further comprises a limiting pawl, one end of the limiting pawl is fixedly connected to the shower head body, and the other end of the limiting pawl is movably snapped between two adjacent ratchet teeth to limit the ratchet wheel from rotating reversely.

6. The shower head structure according to claim 2, wherein the connecting rod is provided with a driving direction, when the connecting rod is slid along the driving direction, the driving wheel rotates along a first rotation direction; and a connecting arm is further disposed at the periphery of the driving wheel, a third connecting block is disposed in the shower head body, and the reset elastic member is connected between the connecting arm and the third connecting block; and when the driving wheel rotates along the first rotation direction, the reset elastic member stores an elastic potential energy for driving the driving wheel to rotate reversely along the first rotation direction.

7. The shower head structure according to claim 6, wherein along the first rotation direction, the connecting arm is placed on a front side of the third connecting block; and when the driving wheel rotates along the first rotation direction, the reset elastic member is in a tensile state.

8. The shower head structure according to claim 6, wherein a guiding plate is protrudingly disposed at one side of the second end near an interior of the shell assembly, and a guiding bevel is disposed at one side of the guiding plate near the connecting rod;

the guiding bevel is gradually inclined towards a direction near the connecting rod from an end near the first end to an end away from the first end; and an abutting part that abuts against the guiding bevel is protrudingly disposed at one side of the connecting rod near the key, and a surface of the abutting part near the guiding bevel is a circular arc surface.

9. The shower head structure according to claim 6, wherein the shower head structure further comprises a limiting pawl, one end of the limiting pawl is fixedly connected to the shower head body, and the other end of the limiting pawl is movably snapped between two adjacent ratchet teeth to limit the ratchet wheel from rotating reversely.

10. The shower head structure according to claim 2, wherein a guiding plate is protrudingly disposed at one side of the second end near an interior of the shell assembly, and a guiding bevel is disposed at one side of the guiding plate near the connecting rod;

the guiding bevel is gradually inclined towards a direction near the connecting rod from an end near the first end to an end away from the first end; and an abutting part that abuts against the guiding bevel is protrudingly disposed at one side of the connecting rod near the key, and a surface of the abutting part near the guiding bevel is a circular arc surface.

11. The shower head structure according to claim 1, wherein a guiding plate is protrudingly disposed at one side of the second end near an interior of the shell assembly, and a guiding bevel is disposed at one side of the guiding plate near the connecting rod;

the guiding bevel is gradually inclined towards a direction near the connecting rod from an end near the first end to an end away from the first end; and an abutting part that abuts against the guiding bevel is protrudingly disposed at one side of the connecting rod near the key, and a surface of the abutting part near the guiding bevel is a circular arc surface.

12. The shower head structure according to claim 1, wherein the shower head structure further comprises a limiting pawl, one end of the limiting pawl is fixedly connected to the shower head body, and the other end of the limiting pawl is movably snapped between two adjacent ratchet teeth to limit the ratchet wheel from rotating reversely.

13. A shower device, comprising the shower head structure according to claim 1.

* * * * *